United States Patent
Gorodisher et al.

(10) Patent No.: US 9,371,477 B2
(45) Date of Patent: Jun. 21, 2016

(54) POLYMERIZABLE COMPOSITION INCLUDING A BENZOXAZINE AND AN ACID-FORMING PEROXIDE CATALYST, ARTICLE, AND METHOD

(71) Applicant: 3M INNOVATIVE PROPERTIES COMPANY, St. Paul, MN (US)

(72) Inventors: Ilya Gorodisher, Stillwater, MN (US); Dmitriy Salnikov, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/437,052

(22) PCT Filed: Dec. 11, 2013

(86) PCT No.: PCT/US2013/074248
§ 371 (c)(1),
(2) Date: Apr. 20, 2015

(87) PCT Pub. No.: WO2014/105422
PCT Pub. Date: Jul. 3, 2014

(65) Prior Publication Data
US 2015/0299541 A1 Oct. 22, 2015

Related U.S. Application Data

(60) Provisional application No. 61/746,209, filed on Dec. 27, 2012.

(51) Int. Cl.
| | |
|---|---|
| *C08G 63/02* | (2006.01) |
| *C09J 179/04* | (2006.01) |
| *C08G 73/02* | (2006.01) |
| *C08G 73/06* | (2006.01) |
| *C09J 179/02* | (2006.01) |
| *C09D 179/04* | (2006.01) |
| *C08G 64/00* | (2006.01) |

(52) U.S. Cl.
CPC ........... *C09J 179/04* (2013.01); *C08G 73/0233* (2013.01); *C08G 73/06* (2013.01); *C09D 179/04* (2013.01); *C09J 179/02* (2013.01)

(58) Field of Classification Search
CPC ................................................. C09J 179/04
USPC .................................. 528/211; 428/413, 414
See application file for complete search history.

(56) References Cited

U.S. PATENT DOCUMENTS

| | | |
|---|---|---|
| 3,018,262 A | 1/1962 | Schroeder |
| 3,298,998 A | 1/1967 | McConnell |
| 3,496,250 A | 2/1970 | Czerwinski |
| 4,073,476 A | 2/1978 | Frank |
| 4,118,377 A | 10/1978 | D'Alelio |
| 4,868,288 A | 9/1989 | Meier |
| 5,059,701 A | 10/1991 | Keipert |
| 5,089,536 A | 2/1992 | Palazzotto |
| 5,191,101 A | 3/1993 | Palazzotto |
| 5,494,943 A | 2/1996 | Mahoney |
| 5,543,516 A | 8/1996 | Ishida |
| 5,554,664 A | 9/1996 | Lamanna |
| 6,225,440 B1 | 5/2001 | Ishida |
| 7,041,772 B2 | 5/2006 | Aizawa |
| 8,383,706 B2 | 2/2013 | Gorodisher |
| 8,389,758 B2 | 3/2013 | Gorodisher |
| 2011/0054100 A1 | 3/2011 | Gorodisher |
| 2014/0199549 A1* | 7/2014 | Shin ....................... C09J 161/06 428/402 |

FOREIGN PATENT DOCUMENTS

| | | |
|---|---|---|
| EP | 0094914 | 11/1983 |
| WO | WO 89-05464 | 6/1989 |
| WO | WO 02-00757 | 1/2002 |
| WO | WO 2009-067112 | 5/2009 |
| WO | WO 2010-141396 | 12/2010 |
| WO | WO 2010-141397 | 12/2010 |
| WO | WO 2012-018753 | 2/2012 |
| WO | WO 2012-134731 | 10/2012 |
| WO | WO 2012-135180 | 10/2012 |
| WO | WO 2013-048851 | 4/2013 |
| WO | WO 2014-052255 | 4/2014 |

OTHER PUBLICATIONS

Ghosh, "Polybenzoxazine—New High Performance Thermosetting Resins: Synthesis and Properties," Progress in. Polymer. Science, 2007; No. 32, pp. 1344-1391.
Ishida, Handbook of Benzoxazine, 212 (2011).
Wang: "Cationic ring-opening polymerization of benzoxazines", Polymer, Jul. 1, 1999, vol. 40, pp. 4563-4570.
International Search Report for PCT International Application No. PCT/US2013/074248, mailed on Mar. 18, 2014, 4pgs.

* cited by examiner

*Primary Examiner* — Terressa Boykin
(74) *Attorney, Agent, or Firm* — Kent S. Kokko

(57) ABSTRACT

A polymerizable composition, articles, and methods are provided, wherein the polymerizable composition includes a benzoxazine, an acid-forming peroxide catalyst and optionally a film-forming polymer, a co-catalyst, a curative, or a combination thereof.

13 Claims, 1 Drawing Sheet

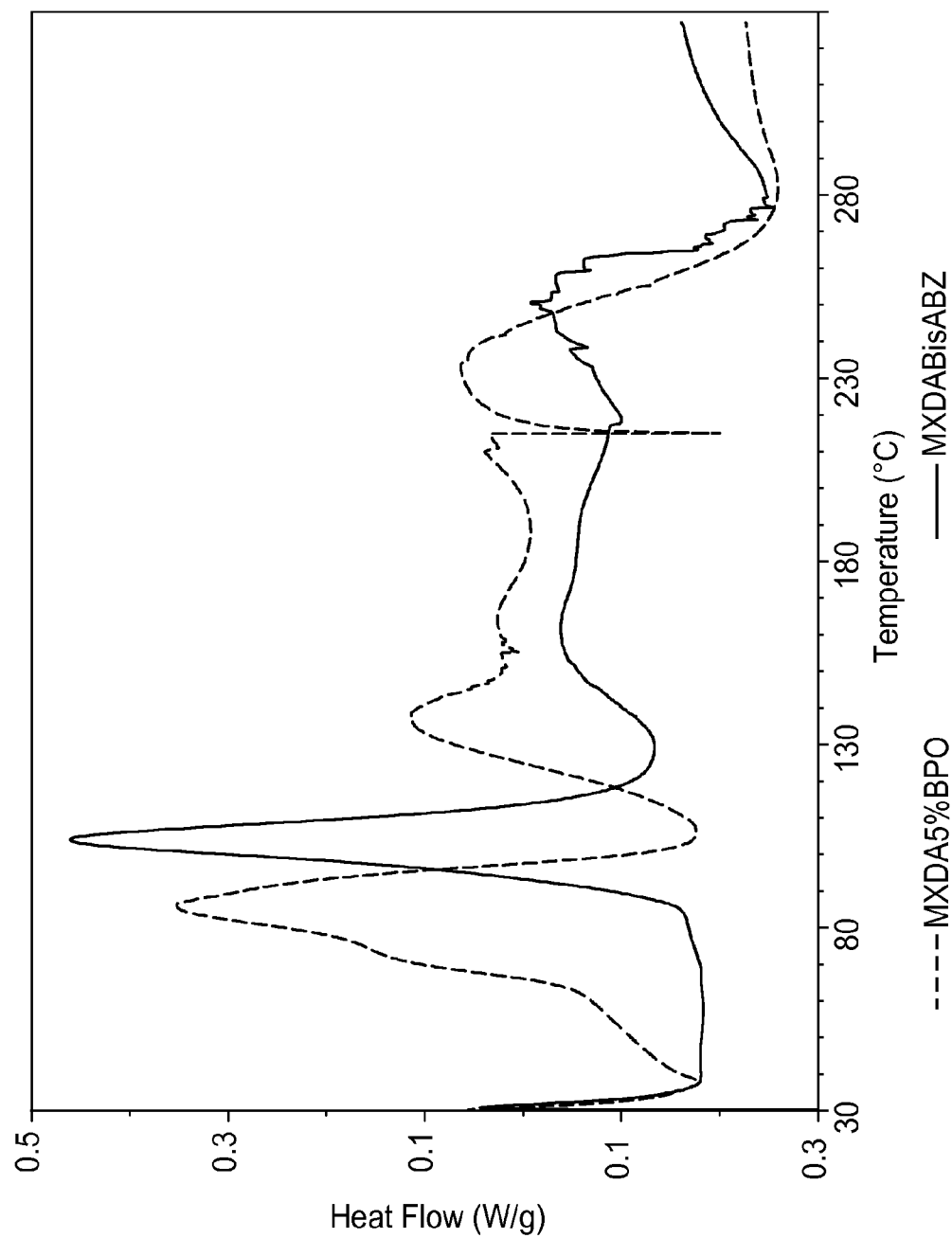

US 9,371,477 B2

POLYMERIZABLE COMPOSITION INCLUDING A BENZOXAZINE AND AN ACID-FORMING PEROXIDE CATALYST, ARTICLE, AND METHOD

CROSS REFERENCE TO RELATED APPLICATIONS

This application is a national stage filing under 35 U.S.C. 371 of PCT/US2013/074248, filed Dec. 11, 2013, which claims priority to Provisional Application No. 61/746,209, filed Dec. 27, 2012, the disclosure of which is incorporated by reference in its/their entirety herein.

BACKGROUND

Benzoxazines represent a relatively new class of high temperature and high performance thermoset polymers. Traditional shortcomings include the need for applying high temperatures during formation of such polymers, and the formation of polymers that are highly crosslinked and brittle. Methods and compositions to reduce the polymerization temperature have been developed, but the need continues for additional methods and compositions.

SUMMARY

The present disclosure provides polymerizable compositions that include a benzoxazine and an acid-forming peroxide catalyst. Such polymerizable compositions may be useful in the formation of coatings, sealants, adhesives, and many other applications, particularly in high temperature applications.

In one embodiment, the present disclosure provides a polymerizable composition including: a benzoxazine; an acid-forming peroxide catalyst; and a film-forming material, a co-catalyst, a curative, or a combination thereof.

In certain embodiments, a polymerizable composition can further include a toughener (i.e., toughening agent), an epoxy resin, a reactive diluent, or combinations thereof.

It will be understood by one of skill in the art that one compound may form two or more different functions. For example, a compound may function as both a toughening agent and a curative, or a compound may function as both a film-forming material and a curative.

Polymerizable compositions of the present disclosure may include an organic solvent, although certain embodiments are free of a chlorinated organic solvent. For example, in one embodiment, the present disclosure provides a polymerizable composition including: a benzoxazine; and an acid-forming peroxide catalyst; wherein the polymerizable composition is free of a chlorinated organic solvent.

In one embodiment, the present disclosure provides an article including a substrate and an adhesive film disposed thereon that includes a polymerizable composition as described herein.

The present disclosure also provides methods of forming an adhesive.

In one embodiment, the method of forming an adhesive includes: providing a polymerizable composition as described herein; and heating the polymerizable composition at a temperature and for a time effective to at least partially polymerize the benzoxazine.

In one embodiment, the method of forming an adhesive includes: providing a polymerizable composition comprising a benzoxazine and an acid-forming peroxide catalyst; and heating the polymerizable composition at a temperature of at least 150° C. for a time effective to at least partially polymerize the benzoxazine.

As used herein, the term "alkyl" refers to a monovalent group that is a radical of an alkane and includes straight-chain, branched, and cyclic alkyl groups, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of "alkyl" as used herein includes, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like. Unless otherwise noted, alkyl groups may be mono- or poly-valent.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or poly-valent.

The term "arylene" refers to a divalent group that is aromatic, and optionally carbocyclic. The arylene has at least one aromatic ring. Any additional rings can be unsaturated, partially saturated, or saturated. Optionally, an aromatic ring can have one or more additional carbocyclic rings that are fused to the aromatic ring. Arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group. The term "alkaryl" refers to a monovalent group that is an aryl substituted with an alkyl group. For both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "aralkylene" refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. For both groups, the alkyl or alkylene portion typically has from 1 to 20 carbon atoms, 1 to 10 carbon atoms, 1 to 6 carbon atoms, or 1 to 4 carbon atoms. For both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

The term "heteroalkyl" includes both straight-chain, branched, and cyclic alkyl groups with one or more heteroatoms independently selected from S, O, and N, including both unsubstituted and substituted alkyl groups. Unless otherwise indicated, the heteroalkyl groups typically contain from 1 to 20 carbon atoms. "Heteroalkyl" is a subset of "hetero(hetero) hydrocarbyl" described below. Examples of "heteroalkyl" as used herein include, but are not limited to, methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or poly-valent.

The term "(hetero)hydrocarbyl" is inclusive of (hetero) hydrocarbyl alkyl and aryl groups, and hetero(hetero)hydrocarbyl heteroalkyl and heteroaryl groups, the latter including one or more catenary oxygen heteroatoms such as ether or amino groups. Hetero(hetero)hydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms and can optionally include substituents such as hydroxyl, chloro, amino, and carboxylic acid. Some examples of such (hetero)hydrocarbyls as used herein include, but are not limited to, methoxy, ethoxy, propoxy, 4-diphenylaminobutyl, 2-(2'-phenoxyethoxyl)ethyl, 3,6-dioxaheptyl, 3,6-dioxahexyl-6-phenyl, in addition to those described for "alkyl," "heteroalkyl," "aryl," and "heteroaryl" described above.

As used herein, the term "residue" is used to define the (hetero)hydrocarbyl portion of a group remaining after removal (or reaction) of the attached functional groups, or the attached groups in a depicted formula. For example, the "residue" of butyraldehyde, $C_4H_9$—CHO is the alkyl $C_4H_9$— if both amino groups have reacted. Likewise, if both amino groups have reacted, the residue of hexamethylene diamine $H_2N$—$C_6H_{12}$—$NH_2$ is the alkylene-$C_6H_{12}$—, the residue of phenylene diamine $H_2N$—$C_6H_4$—$NH_2$ is the divalent aryl-$C_6H_4$—, and the residue of diamino-polyethylene glycol $H_2N$—$(C_2H_4O)_{1-20}$—$C_2H_4$—$NH_2$ is the divalent (hetero)hydrocarbyl polyethylene glycol —$(C_2H_4O)_{1-20}$—$C_2H_4$—.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

When a group is present more than once in a formula described herein, each group is "independently" selected, whether specifically stated or not. For example, when more than one R group is present in a formula, each R group is independently selected. Furthermore, subgroups contained within these groups are also independently selected. For example, when each R group contains a Y group, each Y is also independently selected.

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIG. 1 shows differential scanning calorimetry traces of BZ-1 cured using MXDA, and MXDA with benzoyl peroxide.

DETAILED DESCRIPTION OF EXEMPLARY EMBODIMENTS

The present disclosure provides polymerizable compositions that include a benzoxazine, an acid-forming peroxide catalyst, and optionally additives such as a film-forming material, a co-catalyst, a curative, a toughener, an epoxy resin, a solvent, or a combination thereof. Such polymerizable compositions may be useful in the formation of coatings, sealants, adhesives, and many other applications, particularly in high temperature applications.

The present disclosure further provides a polymerizable composition comprising a benzoxazine compound and catalyst, which when polymerized, is useful in high temperature structural adhesive applications. The present disclosure further provides a method of preparing a polybenzoxazine comprising heating the polymerizable composition at a temperature, and for a time sufficient, to effect polymerization. In some embodiments, a film-former, which may be non-reactive or reactive with the benzoxazine, may be added to the polymerizable composition.

The present disclosure overcomes many of the deficiencies noted for the polymerization of polybenzoxazines, including lower polymerization temperatures and reduced exotherms. In some embodiments, the resultant polybenzoxazines are flexible solids having good thermal stability, and are useful for many industrial applications.

Benzoxazines

As used herein, the term "benzoxazine" is inclusive of compounds and polymers having the characteristic benzoxazine ring as shown in Formula I.

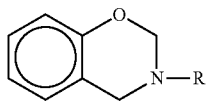
(I)

In the illustrated benzoxazine group, R is the residue of a mono- or poly-amine (including di- or higher-functional benzoxazines).

In the preparation of the polymerizable compositions of the present disclosure, a wide variety of benzoxazine compounds may be used. Benzoxazines may be prepared by combining a phenolic compound, and aliphatic aldehyde, and a primary amine compound. U.S. Pat. No. 5,543,516 (Ishida) and U.S. Pat. No. 7,041,772 (Aizawa et al.) describe methods of forming benzoxazines. Other suitable reaction schemes to produce mono-, di-, and higher-functional benzoxazines are described in N. N. Ghosh et al., *Polybenzoxazine-new high performance thermosetting resins: synthesis and properties, Prog. Polym. Sci.* 32 (2007), pp. 1344-1391. Also, benzoxazines can be obtained from commercial sources such as Huntsman Chemical Advanced Materials America Inc. (Woodlands Tex.) and Shikoku (Kawaga, Japan). For example, 2,2-bis(3,4-dihydro-3-phenyl-1,3-benzoxazine)propane bisphenol-A based benzoxazine, can be obtained from Shikoku Chemicals Co., Ltd. (Kagawa, Japan).

The polymerization of benzoxazine monomers to a polymer is believed to be an ionic ring opening polymerization which converts the oxazine ring to another structure, e.g., linear polymer or larger heterocyclic rings. Such polymerization can be catalyzed by an acid-forming peroxide catalyst, optionally with co-catalysts as described herein. Also, an optional curative can be used in the polymerization. Such curative is typically incorporated into the backbone of the resultant polymer. Other additives can be used to modify the properties of the benzoxazine, including, for example, film-forming materials, toughening agents, and epoxy resins.

Acid-Forming Peroxide Catalysts

The catalyst of the polymerizable composition is an acid-forming peroxide catalyst. Desirably, the decomposition point of the selected catalyst is lower than the thermal self-catalysis temperature of the benzoxazine employed.

In certain embodiments, the acid-forming peroxide catalyst includes a carboxyl group, acetyl group, phthalyl group, sulfonyl group, or a combination thereof. In certain embodiments, the acid-forming peroxide catalyst is selected from the group of a diacyl peroxide, a peroxydicarbonate, a peroxyester, and a combination thereof.

Suitable diacyl peroxides are of the formula:

(II)

Suitable peroxydicarbonates are of the formula:

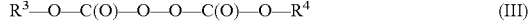
(III)

Suitable peroxyesters are of the formula:

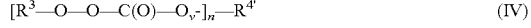
(IV)

In Formulas II, III, and IV:

each $R^3$ is independently an alkyl group, an aryl group, or combination thereof (an alkaryl or aralkyl group), optionally substituted by hydroxyl groups or carboxylic acid groups;

each $R^4$ is independently an alkyl group, an aryl group, or combinations thereof, optionally substituted by hydroxyl groups or carboxylic acid groups;

y is 0 or 1;

n is 1, 2, or more; and $R^{4'}$ is an alkyl group, aryl group, or combination thereof, optionally substituted by hydroxyl groups, when n is one;

$R^{4'}$ is an alkylene group, arylene group, or combination thereof (an alkarylene or aralkylene group), optionally substituted by hydroxyl groups, when n is two; or $R^{4'}$ is a polyvalent alkylene group, arylene group, or combination thereof, optionally substituted by hydroxyl groups, when n is more than two.

Examples of suitable diacyl peroxides include decanoyl peroxide, lauroyl peroxide, succinic acid peroxide, and benzoyl peroxide. Examples of suitable peroxydicarbonates include di(n-propyl)peroxydicarbonate, di(sec-butyl)peroxydicarbonate, and di(2-ethylhexyl)peroxydicarbonate. Examples of suitable peroxyesters include 3-hydroxy-1,1-dimethylbutyl peroxyneodecanoate, α-cumyl peroxyneodecanoate, t-amyl peroxyneodecanoate, t-butyl peroxyneodecanoate, t-amyl peroxypivalate, t-butyl peroxypivalate, 2,5-di(2-ethylhexanoylperoxy)-2,5-dimethylhexane, t-amyl peroxy-2-ethylhexanoate, t-butyl peroxy-2-ethylhexanoate, t-amyl peroxyacetate, t-butyl peroxyacetate, t-butyl peroxybenzoate, OO-(t-amyl)-O-(2-ethylhexyl) monoperoxycarbonate, OO-(t-butyl)-O-isopropyl monoperoxycarbonate, OO-(t-butyl)-O-(2-ethylhexyl)monoperoxycarbonate, polyether poly-t-butylperoxy carbonate, and t-butyl peroxy-3,5,5-trimethylhexanoate. Suitable peroxides are available under the trade name LUPEROX from Arkema Inc., Philadelphia, Pa.

Various combinations of acid-forming peroxide catalysts can be used if desired.

An acid-forming peroxide catalyst is present in an amount of at least 0.1 percent by weight (wt-%), and in certain embodiments, at least 1 wt-%, based on the total weight of the polymerizable composition. In certain embodiments, an acid-forming peroxide catalyst is present in an amount of no greater than 10 wt-%, and in certain embodiments, no greater than 5 wt-%, based on the total weight of the polymerizable composition. If using more than this amount, $CO_2$ may be given off, which can be undesirable for some applications.

Co-Catalysts

Suitable co-catalysts include those selected from the group of elemental sulfur, elemental selenium, a sulfide of a Group VA element (e.g., N, P, As, Sb, Bi) of the Periodic Table (referring to the older CAS or American group numbering system), a sulfide of a Group VIA element (e.g., O, S, Se, Te, Po), a selenide of a Group VA element, a selenide of a Group VIA element, and a combination thereof.

Desirably, the melting point of the selected added co-catalyst is lower than the thermal self-catalysis temperature of the benzoxazine employed.

Crystalline or amorphous forms of elemental sulfur may be used as a co-catalyst. Elemental sulfur is nominally described as a $S_8$ ring, although other polymers and oligomers are known. Various allotropic forms of elemental selenium may be used. Nominally, selenium sulfide refers to many different compounds of sulfur and selenium, but is generally given by the formula $SeS_2$. Phosphorus sesquisulfide, phosphorus pentasulfide, and tetrasulfur tetranitride can be used.

Other suitable co-catalysts are salts of an organometallic complex cation, Such compounds include cations that have at least one carbon atom bonded to a transition metal atom.

In certain embodiments of polymerizable compositions of the disclosure, the organometallic complex salt of the polymerizable compositions of the present disclosure is represented by the following formula:

$$[(L^1)_y(L^2)_z M]^{+q} X_n \quad (V)$$

wherein in Formula (V):

M is selected from the group Cr, Ni, Mo, W, Mn, Tc, Re, Fe, Ru, Os, Co, Rh, and Ir;

$L^1$ and $L^2$ represent the same or different ligands contributing pi-electrons that can be selected from aromatic compounds and heterocyclic aromatic compounds, and the ligand is capable of contributing six pi-electrons to the valence shell of M;

q is an integer having a value of 1 or 2, the residual charge of the complex cation;

y and z are integers having a value of 0, 1, or 2, provided that the sum of y and z is equal to 2;

X is a suitable anion (one that does not interfere with the polymerization); and n is an integer having a value of 1 or 2, the number of complex anions required to neutralize the charge q on the complex cation.

Examples of ligands $L^1$ and $L^2$ in Formula (V) include substituted an unsubstituted carboxylic and heterocyclic aromatic ligands having up to 25 rings; up to 100 carbon atoms, and up to 10 heteroatoms (selected from N, S, non-peroxidic O, P, As, Sc, B, Sb; Te, Si, Ge, Sn), such as, for example, $eta^6$-benzene, $eta^6$-mesitylene, $eta^6$-toluene, $eta^6$-p-xylene, $eta^6$-o-xylene, $eta^6$-m-xylene, $eta^6$-cumene, $eta^6$-durene, $eta^6$-pentamethylbenzene, $eta^6$-hexamethylbenzene, $eta^6$-fluorene, eta naphthalene, $eta^6$-anthracene, $eta^6$-perylene, $eta^6$-chrysene, $eta^6$-pyrene, $eta^6$-triphenylmethane, $eta^6$-paracyclophane, $eta^6$-carbazole, $eta^5$-cyclopentadienyl anion, for example, eta5-cyclopentadienyl anion, $eta^5$-methylcyclopentadienyl anion, $eta^5$-pentamethylcyclopentadienyl anion, $eta^5$-trimethylsilylcyclopentadienyl anion, $eta^5$-trimethyltincyclopentadienyl anion, $eta^5$-triphenyltincyclopentadienyl anion, $eta^5$-triphenylsilylcyclopentadienyl anion, and $eta^5$-indenyl anion.

In certain embodiments, $L^2$ in Formula (V) represents the same or different ligands contributing pi-electrons that can be selected from cyclopentadienyl and indenyl anion groups, and the ligand is capable of contributing six pi-electrons to the valence shell of M.

Each of the ligands $L^1$ and $L^2$ in Formula (V) can be substituted by groups that do not interfere with the complexing action of the ligand to the metal atom or that do not reduce the solubility of the ligand to the extent that competing with the metal atom does not take place. Examples of substituting groups, all of which typically have less than 30 carbon atoms and up to 10 hetero atoms (selected from N, S, non-peroxidic O, P, Ar, Sc, Sb, Te, Si, Ge, Sn, and B), including hydrocarbyl groups such as methyl, ethyl, butyl, dodecyl, tetracosanyl, phenyl, benzyl, allyl, benzylidene, ethenyl, and ethynyl; cyclohydrocarbyl such as cyclohexyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, and cyclohexanecarbonyloxy; hydrocarbylcarbonamido, for example, acetamido, benzamid; azo; boryl; halo, for example, chloro, iodo, bromo, and fluoro; hydroxy; cyano; nitro; nitroso; oxo; dimethylamino; diphenylphosphino; diphenylarsino; diphenylstibine; trimethylgermane; tributyltin; methylseleno; ethyltelluro; and trimethylsiloxy.

Ligands $L^1$ and $L^2$ in Formula (V) independently can be a unit of a polymer, for example, the phenyl group in polystyrene, or polymethylphenylsiloxane; the carbazole group in polyvinylcarbazole; or the cyclopentadiene group in poly(vinylcyclopentadiene). Polymers having a weight average molecular weight up to 1,000,000 or more can be used.

Suitable anions, X, in Formula (V), for use as the counterion in the ionic salts of the organometallic complex cation in the co-catalyst are those in which X can be represented by the following formula:

$$DQ_r \quad (VI)$$

wherein, in Formula (VI):

D is a metal from Groups IB (e.g., Cu, Ag, Au), IIB (e.g., Zn, Cd, Hg), IIIB (e.g., Sc, Y, La, Ac), IVB (e.g., Ti, Zr, Hf), VB (e.g., V, Nb, Ta), VIB (e.g., Cr, Mo, W), VIIB (e.g., Mn, Tc, Re), and VIIIB (e.g., Fe, Ru, Os, Co, Rh, Ir, Ni, Pd, Pt) or a metal or metalloid from Groups IIIA (e.g., B, Al, Ga, In, Tl), IVA (e.g., C, Si, Ge, Sn, Pb), and VA (e.g., N, P, As, Sb, Bi) of the Periodic Table (referring to the older CAS or American group numbering system).

Q is a halogen atom, hydroxyl group, a substituted or unsubstituted phenyl group, or a substituted or unsubstituted alkyl group; and r is an integer having a value of 1 to 6.

In certain embodiments of Formula (VI), the metal D is copper, zinc, titanium, vanadium, chromium, manganese, iron, cobalt, or nickel and the metalloids preferably are boron, aluminum, antimony, tin, arsenic, and phosphorus. In certain embodiments, the halogen atom, Q, is chlorine or fluorine. Illustrative of suitable anions are $B(phenyl)_4^-$, $B(phenyl)_3 (alkyl)^-$, where alkyl can be ethyl, propyl, butyl, hexyl and the like, $BF_4^-$, $PF_6^-$, $AsF_6^-$, $SbF_6^-$, $FeCl_4^-$, $SnCl_5^-$, $SbF_5OH^-$, $AlCl_4^-$, $AlF_6^-$, $GaCl_4^-$, $InF_4^-$, $TiF_6^-$, $ZrF_6^-$, $B(C_6F_5)_4^-$, $B(C_6F_3(CF_3)_2)_4^-$.

Additional suitable anions, X, in Formula (V), for use as the counterion in the ionic salts of the organometallic complex cations include those in which X is an organic sulfonate. Illustrative of suitable sulfonate-containing anions are $CH_3SO_3^-$, $CF_3SO_3^-$, $C_6H_5SO_3^-$, p-toluenesulfonate, p-chlorobenzenesulfonate and related isomers. Additional suitable anions include tris-(highly fluorinated alkyl)sulfonyl methide, bis-(highly fluorinated alkyl)sulfonyl imide, and tris-(fluorinated sulfonyl methide, as described in U.S. Pat. No. 5,554,664.

In certain embodiments, the anions, X, in Formula (V) include an anion selected from tris-(highly fluorinated alkyl) sulfonyl methide, bis-(highly fluorinated alkyl)sulfonyl imide, tris-(fluorinated aryl)sulfonyl methide, tetrakis-(fluorinated aryl)borate, organic sulfonate anions, and halogen-containing complex anions of a metal or metalloid (e.g, $SbF_6^-$, $PF_6^-$).

Exemplary such organometallic salts suitable for use as co-catalysts are described in International Publication No. WO 2002/000757 (Mahoney et al), as well as U.S. Pat. No. 5,089,536 (Palazzotto), U.S. Pat. No. 5,059,701 (Keipert), and U.S. Pat. No. 5,191,101 (Palazzotto et al.), as well as EP Pub. Nos. 094,914 (Irving et al.), 094,915 (Meier et al.), and 126,712 (Meier et al.). Illustrations of their use are described in the Examples Section.

Various combinations of co-catalysts can be used if desired.

If a co-catalyst is used, it is present in an amount of at least 0.1 wt-%, based on the total weight of the polymerizable composition. If a co-catalyst is used, it is present in an amount of no greater than 10 wt-%, 5 wt-%, or 2 wt-%, based on the total weight of the polymerizable composition.

Curatives

Polymerizable compositions of the disclosure optionally include one or more curatives. Such curatives are selected from the group of a thiol compound, an amine compound, and a combination thereof. In certain embodiments, at least one of the thiol compound and the amine compound is polyfunctional. Such curatives can function as reactive diluents.

Useful such compounds have at least one nucleophilic functional group that ring-opens the benzoxazine. Such compounds are of the generally formula:

$$R^{10}\text{—}(ZH)_p \quad \quad \text{VII}$$

wherein, in Formula (VII):

$R^{10}$ is a (hetero)hydrocarbyl group;

each Z is independently —S— or —NR$^{11}$, where R$^{11}$ is H or a hydrocarbyl group, including aryl and alkyl; and p is 1 to 6 (in certain embodiments, p is at least 2).

As mentioned above, the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. The ring-opening reaction may be represented by the following Scheme I for reaction of a benzoxazine based on bisphenol A with a curative of formula $R^{10}$—$(ZH)_2$ to form a polymeric material:

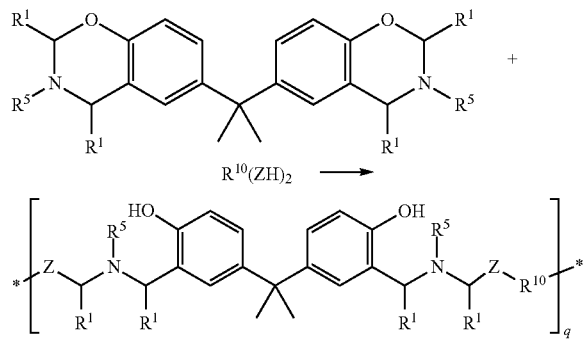

In Scheme I:

each R$^1$ is independently H or an alkyl group, and is the residue of an aliphatic aldehyde, each R$^5$ is independently a (hetero)hydrocarbyl residue of a primary amino compound;

each R$^{10}$ is independently a (hetero)hydrocarbyl group;

Z is a —S— or —NR$^{11}$, wherein each R$^H$ is H or a hydrocarbyl group, including aryl and alkyl p is 1 to 6, or 2 to 6; and q is the number of repeat units and is at least 1 (in certain embodiments, q is at least 2).

Although the curative illustrated in Scheme 1 only has two —ZH groups, other curatives can have more than two —ZH groups. Thus, after reacting with two benzoxazine groups, such curatives can have additional —ZH groups available for further reactions with additional benzoxazine groups. Further, in embodiments where the starting benzoxazine was prepared with a polyamine, R$^5$ groups may be connected to additional benzoxazine groups. Note further that as the composition comprises at least one polyfunctional thiol compound or amine compound, polymeric reaction products result.

In these embodiments there is an excess of benzoxazine, as an unreacted benzoxazine will homopolymerize in the presence of the catalyst to form a coextensive mixture or polymer network of benzoxazine adducts with the curative of Formula (VII) and poly(benzoxazines). In such embodiments, the molar amounts ratio of benzoxazine groups to the sum of amine and/or thiol "Z" groups from the compound R$^{10}$—(ZH)$_p$, is 3:1 to 100:1, or in certain embodiments 4:1 to 50:1.

With reference to the curative of Formula (VII), R$^{10}$(ZH)$_p$, the benzoxazine ring may be ring-opened by an amine compound. Useful amine compounds correspond to primary and secondary amines of the formula:

$$R^{10}(NHR^{11})_p \quad \quad (VIII)$$

wherein, in Formula (VIII), R$^{10}$, R$^{11}$, and p are as defined above for Formula (VII). Such compounds include primary and secondary (hetero)hydrocarbyl monoamines and polyamines. In the compounds of Formula (VIII), the R$^{10}$ may be (hetero)hydrocarbyl group that has a valence of p, and is the residue of a mono-, di- or higher amine having at least one primary amine group. The R$^{10}$ can be an alkyl, a cycloalkyl or aryl, and p is 1 to 4, or 2 to 4. In certain embodiments, the R$^{10}$ is selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen). Each R$^{11}$ is independently H or a hydrocarbyl group, including aryl and alkyl, and p is 1 to 6, or 2 to 6. It will be clear to one skilled in the art that the same amines used in the preparation of the benzoxazines will also be useful in the ring-opening reaction.

The benzoxazine ring may also be opened with thiols of the formula:

$$R^{10}\text{—}(SH)_p \quad \quad (IX)$$

wherein, in Formula (IX), R$^{10}$ and p are as defined above for Formula (VII). That is, in the compounds of Formula (IX), p is 1 to 6, or 2 to 6, and R$^{10}$ includes a (hetero)hydrocarbyl group, including aliphatic and aromatic monothiols and polythiols. R$^4$ may optionally further include one or more functional groups including hydroxyl, acid, ester, cyano, urea, urethane and ether groups.

In some preferred embodiments, the thiol compounds of Formula (IX) are of the formula:

$$R^{12}\text{-}[(CO_2)_x\text{—}R^{13}\text{—}SH]_y \quad \quad (X)$$

wherein in Formula (X):

R$^{12}$ is an alkylene group, an aryl group, an oxyalkylene group, or combination thereof; R$^{13}$ is a divalent hydrocarbyl group;

x is 0 or 1; and y is 1 to 6, or 2 to 6.

Useful thiol compounds falling within the scope of Formula (X) include thiols of the following formulas:

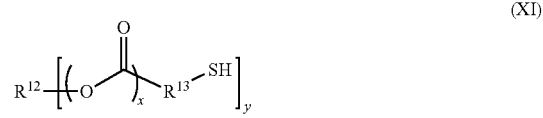

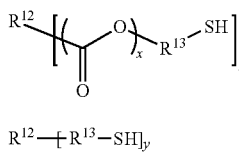

(XII)

(XIII)

wherein:

$R^{12}$ is an alkylene group, an aryl group, an oxyalkylene group, or combination thereof;

$R^{13}$ is a divalent hydrocarbyl group;

x is 0 or 1; and y is 1 to 6, or 2 to 6.

In certain embodiments, the compounds of Formulas (XI) to (XIII) are those in which $R^{12}$ is an alkylene group.

Useful alkyl thiols include methyl, ethyl and butyl thiol. Other useful thiols include 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, mercaptoalkanoic acids and esters thereof including mercaptoproionic acid, 2-chloroethanethiol, 2-amino-3-mercaptopropionic acid, dodecyl mercaptan, thiophenol, 2-mercaptoethyl ether, and pentaerythritol tetrathioglycolate. Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminally thiol-substituted carboxylic acid (or derivative thereof such as esters or acyl halides) including α- or β-mercaptocarboxylic acids such as thioglycolic acid or β-mercaptopropionic acid or esters thereof. Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate)pentaerythritol tetrakis(3-mercaptopropionate), all of which are commercially available. A specific example of a polymeric polythiol is polypropylene ether glycol bis(3-mercaptopropionate) which is prepared from polypropylene-ether glycol (e.g., that available under the trade name PLURAXOL P201 from BASF Wyandotte Chemical Corp.) and 3-mercaptopropionic acid by esterification.

In some embodiments, useful thiols include those thiols derived from epoxy compounds. The polythiol may be derived from the reaction between H$_2$S (or equivalent) and an epoxy resin having two or more functional groups and preferably having a molecular weight of less than 1000. For example, bifunctional epoxy resins, such as a bisphenol A epoxy resin and a bisphenol F epoxy resin, and novolak epoxy resins, such as a phenolic novolak epoxy resin and a cresol novolak epoxy resin, or amine epoxy resins, can be used. In addition, generally known polyfunctional epoxy resins, heterocycle-containing epoxy resins, and alicyclic epoxy resins can be used. These epoxy resins may be used alone or in combinations of two or more chemical types or molecular weight ranges.

A particularly useful polythiol is that derived from bisphenol-A diglycidyl ether, available as QX-11 from Japan Epoxy Resins, having a thiol equivalent weight of approximately 245 and the following general structure, where n is at least 1:

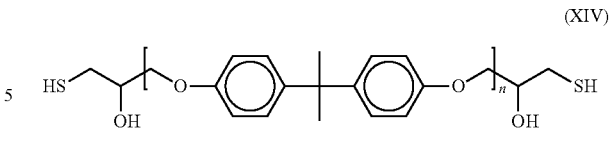

(XIV)

Useful soluble, high molecular weight thiols include polyethylene glycol di(2-mercaptoacetate), and those resins available under the trade names LP-3 (supplied by LP North America, Houston, Tex.) and PERMAPOL P3 (supplied by Products Research & Chemical Corp., Glendale, Calif.), and compounds such as the adduct of 2-mercaptoethylamine and caprolactam.

The compounds of Scheme I may be prepared by combining the benzoxazine compounds with a curative either neat or in a suitable solvent. Suitable solvents include those in which the reactants dissolve, preferably at room temperature, and that are non-reactive with the various components in the polymerizable composition. Examples of suitable solvents include butyl acetate, toluene, xylene, tetrahydrofuran, ethylene glycol dimethyl ether and the like. Heating is generally unnecessary as the thiol and amine-induced ring opening is exothermic.

Combinations of various curatives can be used if desired.

If used, a curative is present in an amount of at least 5%, and often as much as 60% of the benzoxazine equivalent.

Film-Forming Materials

Polymerizable compositions of the present disclosure may include a film-forming material, which can be in the form of monomers, oligomers, polymerizable pre-polymers, polymers, or a combination thereof. These materials, as the name suggests, enable the formation of benzoxazine-containing films that reduce the brittleness of typical benzoxazines. Such films are typically flexible and tacky over a desired temperature window in the sub-ambient to benzoxazine-cure temperature range. The film-former may be reactive or nonreactive with the benzoxazine, or any other components such as the catalyst, co-catalyst, curative, toughener, and the like.

In some embodiments the film-formers are materials, particularly oligomers or polymers, that form a homogenous mixture with the benzoxazine/catalyst mixtures at processing temperatures, preferably from sub-ambient to the processing of the polymerizable benzoxazine composition. Catalyst present in these films provides for excellent shelf life even when the films are stored at elevated temperatures.

Optionally, film formers can have reactive functional groups that react with a portion of the benzoxazine. The film-forming material may include a reactive film-forming material that includes one or more functional groups reactive with the benzoxazine, such as those selected from the group of a thiol, an amine, a benzoxazine, a formaldehyde, an aldehyde, and a combination thereof. The reactive film-forming material may include a compound that can react with, and be bonded to, the benzoxazine. The presence of one or more functional groups can afford increased processability options for said films: they can be processed above or below the reaction temperature of the reactive group to afford variable degree of tack, flexibility, and other desirable properties. Examples of such reactive film formers include, but are not limited to, amine-terminated butadiene-nitrile (ATBN), hydroxy-terminated butadiene-nitrile (HOTBN), carboxy-terminated butadiene-nitrile CTBN, amine-terminated poly (alkylene oxides) (such as those available under the trade names JEFFAMINE and VERSALINK) and related compounds.

In some embodiment the reactive film-formers may have different reactive groups in the backbone and termini. Examples of such materials include the end-functional butadiene-nitrile rubbers such as ATBN, which has unsaturation in its repeat unit and amine functional reactive groups on its ends. The amine functional groups may react with the benzoxazine by nucleophilic ring-opening (e.g., as described herein with respect to the curatives), and the unsaturation may react with the catalyst by vulcanization.

Examples of suitable nonreactive film-forming polymers for coating formulations include acrylic polymers (e.g., poly (methyl methacrylate-co-ethyl acrylate) and poly(methyl acrylate-co-acrylic acid)); polyurethanes (e.g., reaction products of aliphatic, cycloaliphatic or aromatic diisocyanates with polyester glycols or polyether glycols); polyolefins; polystyrene; copolymers of styrene with acrylate(s) (e.g., poly(styrene-co-butyl acrylate); polyesters, (e.g., polyethylene terephthalate, polyethylene terephthalate isophthalate, and polycaprolactone); polyamides, (e.g., polyhexamethylene adipamide); vinyl polymers, (e.g., poly(vinyl acetate/methyl acrylate) and poly(vinylidene chloride/vinyl acetate); polydienes, (e.g., poly(butadiene/styrene)); cellulosic polymer including cellulose ethers and cellulose esters, (e.g., ethyl cellulose and cellulose acetate/butyrate); polyimides; polysulfones; urethane-acrylate copolymers; and polyethers. Such polymers are available, for example, from commercial sources or may be prepared using methods and starting materials known in the art.

Combinations of various film-forming materials may be used if desired.

If used, film-forming material is present in an amount of at least 10 wt-%, and in certain embodiments, at least 25 wt-%, based on the total weight of the polymerizable composition. If used, film-forming material is present in an amount of no greater than 75 wt-%, and in certain embodiments, no greater than 50 wt-%, based on the total weight of the polymerizable composition.

Other Optional Additives

Certain other optional additives may also be included, including, for example, tougheners, epoxy resin, and other reactive diluents. Such additives provide various functions (e.g., film formation). For example, a toughening agent may reduce brittleness and/or add strength to the composition after curing without interfering with curing. An epoxy resin may reduce the viscosity, lower Tg, and/or function as a carrier for a toughening agent.

It will be understood by one of skill in the art that one compound may form two or more different functions. For example, a compound may function as both a toughening agent and a curative.

In some embodiments, such additives will not react with the benzoxazine. In some embodiments, such additives may include reactive functional groups, particularly as end groups.

Examples of such reactive functional groups include, but are not limited to, amines, thiols, alcohols, epoxides, vinyls, and combinations thereof. Toughening agents are useful in polymerizable compositions of the present disclosure are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxide from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski). Exemplary rubbery backbones include polymerized butadiene or a polymerized mixture of butadiene and styrene. Exemplary shells including polymerized methacrylic acid esters are lower alkyl (C1-C4) substituted methacrylates. Exemplary monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would poison the catalyst.

Examples of useful toughening agents of the second type are acrylate core-shell graft copolymers wherein the core or backbone is a polyacrylate polymer having a glass transition temperature below 0° C., such as polybutyl acrylate or polyisooctyl acrylate to which is grafted a polymethacrylate polymer (shell) having a glass transition above 25° C., such as polymethylmethacrylate.

The third class of toughening agents useful in the invention includes elastomeric particles that have a glass transition temperature ($T_g$) below 25° C. before mixing with the other components of the composition. These elastomeric particles are polymerized from free radical polymerizable monomers and a copolymerizable polymeric stabilizer that is soluble in the benzoxazine. The free radical polymerizable monomers are ethylenically unsaturated monomers or diisocyanates combined with co-reactive difunctional hydrogen compounds such as diols, diamines, and alkanolamines.

Useful toughening agents include core/shell polymers, such as methacrylate-butadiene-styrene (MBS) copolymer wherein the core is crosslinked styrene/butadiene rubber and the shell is polymethylacrylate (for example, those available under the trade names ACRYLOID KM653 and KM680, from Rohm and Haas, Philadelphia, Pa.), those having a core including polybutadiene and a shell including poly(methyl methacrylate) (for example, those available under the trade names KANE ACE M511, M521, B11A, B22, B31, and M901 from Kaneka Corporation, Houston, Tex. and CLEARSTRENGTH C223 from ATOFINA, Philadelphia, Pa.), those having a polysiloxane core and a polyacrylate shell (for example, those available under the trade names CLEARSTRENGTH S-2001 from ATOFINA and GENIOPERL P22 from Wacker-Chemie GmbH, Wacker Silicones, Munich, Germany), those having a polyacrylate core and a poly(methyl methacrylate) shell (for example, those available under the trade names PARALOID EXL2330 from Rohm and Haas and STAPHYLOID AC3355 and AC3395 from Takeda Chemical Company, Osaka, Japan), those having an MBS core and a poly(methyl methacrylate) shell (for example, those available under the trade names PARALOID EXL2691A, EXL2691, and EXL2655 from Rohm and Haas); and the like; and mixtures thereof.

As used above, for acrylic core/shell materials "core" will be understood to be an acrylic polymer having a $T_g$ of less than 0° C. and "shell" will be understood to be an acrylic polymer having a $T_g$ of greater than 25° C.

Other useful toughening agents include: carboxylated and amine terminated acrylonitrile/butadiene vulcanizable elastomer precursors, such as those available under the trade names HYCAR CTBN 1300X8, ATBN 1300X16, and HYCAR 1072 from B. F. Goodrich Chemical Co.; butadiene polymers, such as those available under the trade name HYCAR CTB; amine functional polyethers such as HCl 101 (i.e., polytetramethylene oxide diamine) a 10,000 MW, primary amine-terminated, compound from 3M Co., St. Paul, Minn., and those available under the trade name JEFFAMINE from Huntsman Chemical Co., Houston, Tex.; functional acrylic rubbers including acrylic core/shell materials, such as those available under the trade names ACRYLOID KM330 and 334 from Rohm & Haas; and core/shell polymers, such as methacrylate-butadiene-styrene (MBS) copolymer wherein the core is crosslinked styrene/butadiene rubber and the shell is polymethylacrylate (e.g., that available under the trade names ACRYLOID KM653 and KM680; Rohm and Haas). Useful liquid poly-butadiene hydroxyl terminated resins include those available under the trade names LIQUIFLEX H by Petroflex of Wilmington, Del., and HT 45 by Sartomer of Exton, Penna.

Tougheners may include epoxy-terminated compounds, which can be incorporated into the polymer backbone. A typical, preferred, list of tougheners includes: acrylic core/shell polymers; styrene-butadiene/methacrylate core/shell polymers; polyether polymers; carboxylated acrylonitrile/butadienes; and carboxylated butadienes. Advantages can be obtained from the provision of the chain extension agent in a composition with an epoxy resin even in the absence of a toughening agent as described above. However, particular advantage is achieved from the presence of the toughening agent or combinations of different agents, as previously suggested.

It will be appreciated that some of the described natural and synthetic rubbers will have unsaturation in the chain that can be crosslinked by the catalyst. Thus, the catalyst will polymerize the benzoxazine, and concurrently vulcanize the rubber to for a coextensive network of poly(benzoxazine) and vulcanized rubber.

Various combinations of toughening agents can be used if desired.

If used, a toughening agent is present in a polymerizable composition in an amount of at least 3 wt-%, or at least 5 wt-%, based on the weight of the benzoxazine. If used, a toughening agent is present in a polymerizable composition in an amount of no greater than 35 wt-%, or no greater than 25 wt-%, based on the weight of the benzoxazine.

Other optional additives include epoxy resins. Such materials may function as a curative, a reactive diluent, or a co-reactant. The epoxy group does not react directly with the benzoxazine as do the amines or thiols of the curatives, but the phenolic group resulting from the ring opening of the benzoxazine, or the acid-forming peroxide may further react to ring-open the epoxy groups.

Polyepoxy compounds which can be utilized in the compositions of the disclosure include both aliphatic and aromatic polyepoxides. In certain embodiments, glycidyl aliphatic epoxides are preferred. The aromatic polyepoxides are compounds containing at least one aromatic ring structure, e.g., a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the disclosure include 3',4'-epoxycyclohexylmethyl-3,4-epoxycyclohexanecarboxylate, 3,4-epoxycyclohexyloxirane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof. Preferred such polyepoxides do not include cycloaliphatic groups.

Representative examples of aromatic polyepoxides, which can be utilized in the composition of the disclosure, include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-(4-(2,3-epoxypropoxyl)phenylpropane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,31-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. No. 3,018,262 (Schroeder) and U.S. Pat. No. 3,298,998 (McConnell et al.), as well as the derivatives described in the Handbook of Epoxy Resins by Lee and Neville, McGraw-Hill Book Co., New York (1967), and mixtures thereof.

An exemplary class of polyepoxy compounds is polyglycidyl ethers of polyhydric alcohol, particularly polyphenols. The glycidyl epoxy compounds are generally more reactive toward amines than cycloaliphatic epoxy compounds. In some embodiments, the epoxy compound generally has an epoxy equivalent weight (EW) of 170 to 4,000, or 170 to 1,000. The epoxide equivalent weight (EW) is defined as the weight in grams of the epoxy functional compound that contains one gram equivalent of epoxy (oxirane) functional groups.

If used, an epoxy resin is present in a polymerizable composition in an amount of at least 5 wt-%, or at least 3 wt-%, based on the weight of the benzoxazine. If used, a toughening agent is useful in a polymerizable composition in an amount of no greater than 35-wt-%, or no greater than 25 wt-%, based on the weight of the benzoxazine.

Other optional additives, or adjuvants, may be added to the compositions as desired. Examples of such other optional additives include as colorants, abrasive granules, anti-oxidant stabilizers, thermal degradation stabilizers, light stabilizers, conductive particles, tackifiers, flow agents, bodying agents, flatting agents, inert fillers, binders, blowing agents, fungicides, bactericides, surfactants, plasticizers, rubber tougheners, and other additives known to those skilled in the art. Such additives are typically substantially unreactive, such as fillers, both inorganic and organic. These adjuvants, if present, or other optional additives, are added in an amount effective for their intended purpose.

The choice and amounts of optional components depend on the needs of the specific application. For example, for a structural/semi-structural benzoxazine adhesive, the polymerizable composition could contain silica fillers, glass bubbles, and tougheners. These adjuvants add toughness to and reduce the density of the polymerized composition. For a protective coating, such as an abrasion resistant coating, which is generally hard, requires a significant portion of the formulation to be a hard resin that includes generally short chain lengths and high functionality. Coatings undergoing some flex require toughness which can be obtained by using the above-mentioned additive to increase toughness and increase flexibility. Clear coatings require the cured resins to have little to no phase separation. This is obtained by controlling the compatibility of the resins or controlling phase separation by cure rate.

Solvents

Polymerizable compositions of the present disclosure may include an organic solvent. Typically, such solvent is one that is used in the preparation of the benzoxazines. In such embodiments, suitable solvents include those in which the reactants dissolve, preferably at room temperature. Solvents may include those that are non-reactive with the reactants and that provide for the subsequent dissolution of co-reactants. In certain embodiments, the polymerizable composition is free of a chlorinated organic solvent. Examples of suitable organic solvents include butyl acetate, toluene, xylene, tetrahydrofuran, ethylene glycol dimethyl ether, and the like.

When a coating formulation that includes a benzoxazine, an acid-forming peroxide catalyst, a film-forming material, and one or more other optional additives (e.g., a co-catalyst, a curative, a toughener), and a solvent is applied to a substrate, the solvent evaporates, and the film-forming material forms a continuous polymer film with the benzoxazine, acid-forming peroxide catalyst, and other optional additives dissolved or dispersed in the film-forming polymer matrix. Coating formulations are typically applied, dried, and optionally heated, leaving the finished product with a solid coating. The addition of surfactants may improve the film forming properties of some formulations by improving the ability of the coating to wet the substrate and/or by allowing for even evaporation of solvent (i.e., leveling) during film formation.

Methods and Uses

Reaction conditions for curing (i.e., polymerizing and/or crosslinking) the polymerizable compositions of the present disclosure depend on the reactants and amounts used and can be determined by those skilled in the art. The polymerizable compositions are made by mixing in any order the benzoxazine compound and the acid-forming peroxide catalyst described above with any optional components. Generally, the composition is then heated to a temperature between 50° C. to 200° C. (in certain embodiments, 130-180° C., and in certain embodiments, the compositions are heated to a temperature of at least 150° C.) for a time effective to at least partially polymerize the benzoxazine (typically, for a time of 1-120 minutes). In many embodiments the mixture is heated to a first temperature in excess of the melting point of the benzoxazine forming a homogeneous mixture, wherein the catalyst dissolves in molten benzoxazine, then to a second, higher, onset temperature where polymerization to a poly(benzoxazine) ensues. Normally the polymerization is done in the absence of solvent.

Suitable sources of heat to cure (polymerize) the compositions of the invention include induction heating coils, ovens, hot plates, heat guns, infrared sources including lasers, microwave sources. Suitable sources of light and radiation include ultraviolet light sources, visible light sources, and electron beam sources.

Compositions of this disclosure are useful for coatings, foams, shaped articles, adhesives (including structural and semistructural adhesives), magnetic media, filled or reinforced composites, coated abrasives, caulking and sealing compounds, casting and molding compounds, potting and encapsulating compounds, impregnating and coating compounds, conductive adhesives for electronics, protective coatings for electronics, and other applications that are known to those skilled in the art. When uncured or partially cured, the benzoxazine compositions exhibit pressure-sensitive adhesive properties, including tack. In some embodiments, the present disclosure provides a coated article comprising a substrate, having a cured coating of the benzoxazine thereon.

In some embodiments, the present disclosure provides "B-stagable" adhesives. Processing applications such as printed circuit manufacture often employ "stageable" adhesives, that is, adhesive compositions which can be partially polymerized to a tacky or tack-free coating, fastened to an adherend, and cured using heat, pressure, or both (see U.S. Pat. No. 4,118,377 (S'Alelio). The tack-free state is sometimes referred to as the "B-Stage."

The present disclosure provides stageable adhesive compositions including benzoxazine compounds, an acid-forming peroxide, and optional components such as a co-catalyst, a curative, and a film-former (optionally having a reactive functional group). The stageable adhesive composition may be coated on an adherend or substrate, and fully cured to a structural or semistructural adhesive using heat.

In an embodiment of a B-stageable adhesive that includes the benzoxazine, an acid-forming peroxide, and a reactive component such as a curative, reactive film-former, or reactive toughening agent, at a first temperature the reactive diluent ring-opens a portion of the benzoxazine to form an adduct. At a second, higher temperature, the curing to the poly(benzoxazine) is effected by the catalyst. If the reactive component, e.g., toughener, further includes chain unsaturation, the catalyst may vulcanize such component.

In some embodiments, the partially cured, stageable adhesive composition may be disposed between two substrates (or adherends), and subsequently heated to fully cure the adhesive and effect a structural or semistructual bond between the substrates. In other embodiments, the stageable adhesive composition may be heated to a flowable viscosity to effect coating of a substrate, which may then be joined to a second substrate while still molten and full curing effected.

B-stageable films are typically prepared by heating up benzoxazine to its melting point and dissolving the desired amount of catalyst in it. Sometimes it may be necessary to further heat the composition to near the melting point of the catalyst to ensure desired solubility. An optional film-former, heated to the desired compounding temperature, is then added and stirred into the benzoxazine/catalyst mixture until uniform, and the resultant composition is then pulled through a knife coater between release liners at optionally elevated temperature to produce a film of desired thickness.

Therefore the present disclosure provides stageable, structural and semi-structural adhesives. "Semi-structural adhesives" are those cured adhesives that have an overlap shear strength of at least 0.5 MPa, at least 1.0 MPa, or at least 1.5 MPa. Those cured adhesives having particularly high overlap shear strength, however, are referred to as structural adhesives. "Structural adhesives" are those cured adhesives that have an overlap shear strength of at least 3.5 MPa, at least 5 MPa, or at least 7 MPa.

The composition may be coated onto substrates at useful thicknesses ranging from 25 micrometers to 500 micrometers, or more. Coating can be accomplished by any conventional means such as roller, dip, knife, or extrusion coating. Solutions of the polymerizable composition may be used to facilitate coating. Suitable rheology is necessary to maintain the desired coating thickness of polymerizable composition (prior to final cure or crosslinking) Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl (meth)acrylate), polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood and composites of the foregoing materials.

The present disclosure further provides a pressure-sensitive adhesive which includes a coating of the uncured or partially cured benzoxazine composition on a suitable substrate, such as an adhesive tape backing. A preferred method of preparing a pressure-sensitive adhesive article includes partially curing the novel composition to a useful coating viscosity, coating the partially crosslinked composition onto a substrate (such as a tape backing) and further curing the composition. Useful coating viscosities are generally in the range of 500 to 10,000 Centipoise (cps).

ILLUSTRATIVE EMBODIMENTS

1. A polymerizable composition comprising:
   a benzoxazine;
   an acid-forming peroxide catalyst; and
   a film-forming material, a co-catalyst, a curative, or a combination thereof.
2. The polymerizable composition of embodiment 1 wherein the acid-forming peroxide catalyst is present in an amount of 0.1 wt-% to 10 wt-%, based on the total weight of the benzoxazine.
3. The polymerizable composition of embodiment 2 wherein the acid-forming peroxide catalyst is present in an amount of 1 wt-% to 5 wt-%, based on the total weight of the benzoxazine.
4. The polymerizable composition of any one of embodiments 1 through 3 wherein the acid-forming peroxide catalyst comprises a carboxyl group, an acetyl group, a phthalyl group, a sulfonyl group, or a combination thereof
5. The polymerizable composition of embodiment 4 wherein the acid-forming peroxide catalyst is selected from the group of a diacyl peroxide, a peroxydicarbonate, a peroxy ester, and a combination thereof.
6. The polymerizable composition of embodiment 5 wherein the acid-forming peroxide
   is a diacyl peroxide of the formula:

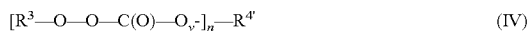

wherein in Formula (II):
   R³ is an alkyl group, an aryl group, or combination thereof (an alkaryl or aralkyl group), optionally substituted by hydroxyl groups or carboxylic acid groups; and
   R⁴ is an alkyl group, an aryl group, or combinations thereof, optionally substituted by hydroxyl groups or carboxylic acid groups.
7. The polymerizable composition of embodiment 5 wherein the acid-forming peroxide
   is a peroxydicarbonate of the formula:

wherein in Formula (III):
   R³ is an alkyl group, an aryl group, or combination thereof (an alkaryl or aralkyl group), optionally substituted by hydroxyl groups or carboxylic acid groups; and
   R⁴ is an alkyl group, an aryl group, or combinations thereof, optionally substituted by hydroxyl groups or carboxylic acid groups.

8. The polymerizable composition of embodiment 5 wherein the acid-forming peroxide
   is a peroxyester of the formula:

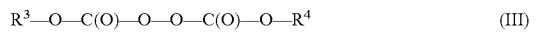

wherein in Formula (IV):
   R³ is an alkyl group, an aryl group, or combination thereof (an alkaryl or aralkyl group), optionally substituted by hydroxyl groups or carboxylic acid groups;
   y is 0 or 1;
   n is 1, 2, or more; and
   R⁴' is an alkyl group, aryl group, or combination thereof, optionally substituted by hydroxyl groups, when n is one;
   R⁴' is an alkylene group, arylene group, or combination thereof (an alkarylene or aralkylene group), optionally substituted by hydroxyl groups, when n is two; or
   R⁴' is a polyvalent alkylene group, arylene group, or combination thereof, optionally substituted by hydroxyl groups, when n is more than two.
9. The polymerizable composition of any one of embodiments 1 through 8 wherein the
   polymerizable composition comprises a benzoxazine, an acid-forming peroxide catalyst, and a film-forming material.
10. The polymerizable composition of embodiment 9 wherein the film-forming material is present in an amount of 10 wt-% to 75 wt-%, based on the total weight of the polymerizable composition.
11. The polymerizable composition of embodiment 10 wherein the film-forming material is present in an amount of 25 wt-% to 50 wt-%, based on the total weight of the polymerizable composition.
12. The polymerizable composition of any one of embodiments 1 through 11 wherein the film-forming material comprises a monomer, an oligomer, a polymerizable pre-polymer, a polymer, or a combination thereof 13. The polymerizable composition of any one of embodiments 1 through 12 wherein the film-forming material is a reactive film-forming material and comprises one or more functional groups reactive with the benzoxazine.
14. The polymerizable composition of embodiment 13 wherein the one or more reactive functional groups in the reactive film-forming compound is selected from the group of a thiol, an amine, an epoxide, a benzoxazine, a formaldehyde, an aldehyde, and a combination thereof
15. The polymerizable composition of embodiment 13 or 14 wherein the reactive film-forming material comprises a compound bonded to the benzoxazine.
16. The polymerizable composition of any one of embodiments 1 through 12 wherein the film-forming material is nonreactive with the benzoxazine.
17. The polymerizable composition of embodiment 16 wherein the nonreactive film-forming material comprises an acrylic polymer, a polyurethane, a styrene-acrylate copolymer, a polyester, a polyamide, a polydiene, a cellulosic polymer, a polyimide, a polysulfone, a urethane-acrylate copolymer, a polyether, and a combination thereof.
18. The polymerizable composition of any one of embodiments 1 through 13 wherein the polymerizable composition comprises a co-catalyst.

19. The polymerizable composition of embodiment 18 wherein the co-catalyst is present in an amount of 0.1 wt-% to 10 wt-%, based on the total weight of the polymerizable composition.

20. The polymerizable composition of embodiment 18 or 19 wherein the co-catalyst is selected from the group of elemental sulfur, elemental selenium, a sulfide of a Group V element, a sulfide of a Group VIA element, a selenide of a Group VA element, a selenide of a Group VIA element, and a combination thereof 21. The polymerizable composition of embodiment 18 or 19 wherein the co-catalyst is a salt of an organometallic complex cation.

22. The polymerizable composition of any one of embodiments 1 through 21 further comprising a curative.

23. The polymerizable composition of embodiment 22 wherein the curative is present in an amount of 5% to 60% of the benzoxazine equivalent.

24. The polymerizable composition of embodiment 22 or 23 wherein the curative is selected from the group of a thiol compound, an amine compound, and a combination thereof.

25. The polymerizable composition of embodiment 24 wherein at least one of the thiol compound and the amine compound is polyfunctional.

26. The polymerizable composition of any one of embodiments 1 through 25 further comprising a toughening agent, an epoxy resin, or both.

27. The polymerizable composition of any one of embodiments 1 through 26 further comprising an organic solvent.

28. The polymerizable composition of any one of embodiments 1 through 27 which is free of a chlorinated organic solvent.

29. A polymerizable composition comprising:
a benzoxazine; and
an acid-forming peroxide catalyst;
wherein the polymerizable composition is free of a chlorinated organic solvent.

30. The polymerizable composition of embodiment 29 wherein the acid-forming peroxide catalyst is present in an amount of 0.1 wt-% to 10 wt-%, based on the total weight of the benzoxazine.

31. The polymerizable composition of embodiment 30 wherein the acid-forming peroxide catalyst is present in an amount of 1 wt-% to 5 wt-%, based on the total weight of the benzoxazine.

32. The polymerizable composition of any one of embodiments 29 through 31 wherein the acid-forming peroxide catalyst comprises a carboxyl group, an acetyl group, a phthalyl group, a sulfonyl group, or a combination thereof 33. The polymerizable composition of embodiment 32 wherein the acid-forming peroxide catalyst is selected from the group of a diacyl peroxide, a peroxydicarbonate, a peroxy ester, and a combination thereof.

34. The polymerizable composition of embodiment 33 wherein the acid-forming peroxide is a diacyl peroxide of the formula:

$$R^3—C(O)—O—O—C(O)—R^4 \qquad (II)$$

wherein in Formula (II):
$R^3$ is an alkyl group, an aryl group, or combination thereof (an alkaryl or aralkyl group), optionally substituted by hydroxyl groups or carboxylic acid groups; and
$R^4$ is an alkyl group, an aryl group, or combinations thereof, optionally substituted by hydroxyl groups or carboxylic acid groups.

35. The polymerizable composition of embodiment 33 wherein the acid-forming peroxide is a peroxydicarbonate of the formula:

$$R^3—O—C(O)—O—O—C(O)—O—R^4 \qquad (III)$$

wherein in Formula (III):
$R^3$ is an alkyl group, an aryl group, or combination thereof (an alkaryl or aralkyl group), optionally substituted by hydroxyl groups or carboxylic acid groups; and
$R^4$ is an alkyl group, an aryl group, or combinations thereof, optionally substituted by hydroxyl groups or carboxylic acid groups.

36. The polymerizable composition of embodiment 33 wherein the acid-forming peroxide is a peroxyester of the formula:

wherein in Formula (IV):
$R^3$ is an alkyl group, an aryl group, or combination thereof (an alkaryl or aralkyl group), optionally substituted by hydroxyl groups or carboxylic acid groups;
y is 0 or 1;
n is 1, 2, or more; and
$R^{4'}$ is an alkyl group, aryl group, or combination thereof, optionally substituted by hydroxyl groups, when n is one;
$R^{4'}$ is an alkylene group, arylene group, or combination thereof (an alkarylene or aralkylene group), optionally substituted by hydroxyl groups, when n is two; or
$R^{4'}$ is a polyvalent alkylene group, arylene group, or combination thereof, optionally substituted by hydroxyl groups, when n is more than two.

37. An article comprising a substrate and an adhesive film disposed thereon comprising a polymerizable composition of any one of embodiments 1 through 36.

38. A method of forming an adhesive, the method comprising:
providing a polymerizable composition of any one of embodiments 1 through 36; and
heating the polymerizable composition at a temperature and for a time effective to at least partially polymerize the benzoxazine.

39. The method of embodiment 38 wherein heating the polymerizable composition occurs at a temperature of at least 150° C.

40. A method of forming an adhesive, the method comprising:
providing a polymerizable composition comprising a benzoxazine and an acid-forming peroxide catalyst; and
heating the polymerizable composition at a temperature of at least 150° C. for a time effective to at least partially polymerize the benzoxazine.

EXAMPLES

Objects and advantages of this disclosure are further illustrated by the following examples, but the particular materials and amounts thereof recited in these examples, as well as other conditions and details, should not be construed to unduly limit this disclosure.

All parts, percentages, ratios, etc. in the examples are by weight, unless noted otherwise.

The amounts of the catalysts for the adhesives were determined by equivalents (eq) based on the moles of reactive groups per mole of reactant molecule, e.g., 2 eq of a bifunctional reactant represents one mole of that reactant, and one mole of a trifunctional reactant would represent 3 eq of that reactant. Catalysts are treated as if monofunctional.

The double dash designation in the tables indicates that the sample was not tested or not determined.

The Exotherm is the exotherm energy released during curing of the composition and may also be referred to as the energy.

Test Methods

Differential Scanning Calorimetry of Cure (DSC Analysis)

The thermal properties of a composition during curing were determined by placing an amount of the composition in an open aluminum pan in a Differential Scanning calorimeter (DSC) and heating from 25° C. to 300° C. or 320° C. at a heating rate of 10° C./min. The DSC was from TA Instruments, New Castle, Del., is designated. The peak cure temperature in ° C. (Peak), the approximate cure onset temperature in ° C. (Onset), and the total energy released (Energy) in Joules/gram (J/g) during curing of the composition from the DSC trace are reported. The Energy corresponds with the peak exotherm on the trace.

Preparation of Test Substrates for Adhesive Bonding Properties

Substrates for testing of adhesive properties (Overlap Shear Strength (OLS) and Floating Roller Peel (FRP)) were 2024 T3 bare aluminum test panels. Aluminum panels measuring 4 in×7 in×0.063 in (10 cm×18 cm×0.16 cm) were used for OLS testing. Panels measuring either 8 in×3 in×0.063 in (20.3 cm×7.6 cm×0.16 cm), or 10 in×3 in×0.025 in (25.4 cm×7.6×0.064 cm) were used for FRP testing. The panels were treated with an FPL etch, anodized with phosphoric acid, and primed as described below.

The panels were FPL etched according to the following process:
  Panels were soaked for 10-11 minutes in a caustic wash solution (Isoprep 44 solution from MacDermid Inc., Denver, Colo.), at a temperature of 71±10° C.
  Panels were placed in a rack and submerged in a tank of tap water for 10 minutes;
  Panels were spray rinsed with tap water for 2-3 minutes;
  The rake of panels were placed in a tank of FPL etch solution (FPL solution of sulfuric acid and sodium dichromate from Forest Products Laboratory, Madison, Wis.) at 71±10° C. for 10-15 minutes;
  The etched panels were spray rinsed with tap water for 2-3 minutes.

The rack of panels was then anodized by submerging into an anodizing tank of phosphoric acid. The panels were anodized at a voltage of 15±1 volts for 23 minutes at a tank temperature of 67-82° F. The panels were drip dried for 10 minutes at ambient temperature, and then for 30 minutes in a re-circulating air oven at 71° C.

The etched and anodized aluminum panels were primed within 24 hours of treatment with a corrosion inhibiting bonding primer for aluminum (3M SCOTCH-WELD Structural Adhesive Primer EW-5000, 3M Company, St. Paul, Minn.) according to the manufacturer's instructions using a spray gun (ACCUSPRAY Model 12S spray gun with 1 quart cup) to provide a dried primer thickness of between 2.6 to 5.2 micrometers. The primed panels were dried for 30 minutes at 75±5° F. followed by 60-65 minutes at 250±5° F.

Preparation of Uncured Adhesive Film with Embedded Nonwoven Scrim

An uncured adhesive sheet between two release liners was embedded with a nonwoven scrim as follows. One of the liners was removed and the adhesive was placed on a sheet of polyester nonwoven scrim that was slightly larger than the adhesive film. The polyester nonwoven scrim (Polyester nonwoven sheet, basis weight of 0.8 grams/square meter, Technical Fibre Products, Inc.; Schenectady, N.Y.). The liner was replaced on top of the scrim on the adhesive and the sandwich was laminated between two heated rollers set at a temperature of about 140° F. (60° C.) using pressure from an air supply with a gauge pressure of 20 psi (137.9 kPa). During lamination, the polyester scrim became embedded in the adhesive between the two release liners.

FRP Panels Preparation

A scrim supported uncured adhesive composition was laminated between FPL prepared (described above) aluminum coupons designated for FRP testing: a 3" by 8" sample of adhesive was sandwiched between two panels and cured in the autoclave as described below.

Overlap Shear Panels Preparation

The uncured adhesive film for OLS testing was placed between two 4 in×7 in×0.063 in (10 cm×18 cm×0.16 cm) prepared aluminum panels (described above) so that they overlapped each other by about 0.5 inches (1.27 cm) and approximately 3.5 inch of panel extended in opposite ends that did not have adhesive on it. This composite was pressed together over the adhesive coated portion and cured in an autoclave as specified below.

Autoclave Curing for OLS or FRP Testing

Bonds were then placed on a vacuum table for 5-10 minutes at full vacuum for compaction. The compacted assembly was then positioned in a vacuum bag and cured in an autoclave in the following manner. After applying a vacuum to reduce the pressure to about 1.9 inches (48.3 mm) Hg, an external pressure of about 45 psi (310 kPa) was applied, and the temperature of the autoclave was heated from about room temperature (72° F. (22° C.)) to 350° F. (177° C.) at a rate of 4.5° F./minute (2.5° C./minute). The vacuum was released when the pressure reached about 15 psi (103.4 kPa). The final temperature and pressure were maintained for 120 minutes before cooling to room temperature at a rate of 5° F./minute (2.8° C./minute), at which point the pressure was released and a cured bonded article was obtained.

Floating Roller Peel (FRP) Test

An uncured adhesive film supported on a scrim was prepared for testing between two prepared aluminum test panels (one 0.16 cm thick and the other 0.064 cm thick) according to ASTM D-3167-76 with the following modification. Aluminum panels were prepared as described above. The test strips measuring 0.5 inch (12.7 cm) wide were cut along the lengthwise direction of the bonded aluminum panels. The test strips were each tested in a tensile testing machine. The thinner substrate was pulled from the thicker one at a peel rate of 6 inches/minute (30.5 cm/minute) and the results were normalized to a width of one inch. The test results are an average of six test samples and the average ($Peel_{avg}$), maximum ($Peel_{max}$), and standard deviation ($Peel_{sd}$) are reported in pounds per inch width (piw).

Overlap Shear Strength (OLS) Test

The cured test panel was cut into 1 inch (2.54) cm wide strips and positioned in the gripping jaws of a tensile tester (MTS Systems Corporation, Eden Prairie, Minn.). The gap between the jaws of the tester was approximately 5.5 inches (13.97 cm) and each jaw gripped approximately 2.54 cm of each strip. The jaws were separated at a speed of 0.05 inches/ minute (1.27 millimeters/minute) using a 30,000 pound-force (13.3 kiloNewtons) load cell until failure occurred. The gripping jaws are positioned inside of an oven after the sample had equilibrated to 75° F. (24° C.), 275° F. (136° C.), or 350° F. (177° C.). The maximum ($OLS_{max}$) and average shear ($OLS_{avg}$) values are an average of six test samples and are reported in pounds per square inch (psi). The standard deviation is also reported ($OLS_{sdev}$).

Materials Used

Solvents and other reagents used were obtained from Sigma-Aldrich Chemical Company (Milwaukee, Wis.) unless specified otherwise.

Azo1 refers to VAZO 67 free radical initiator 2,2'-azobis (2-methylbutyronitrile) that is available from DuPont (Wilmington, Del.).

Azo2 refers to VAZO 52 free radical initiator 2,2'-azobis (2,4-dimethylvaleronitrile) that is available from DuPont (Wilmington, Del.).

AIBN refers to the free radical initiator azobisisobutylonitrile that is available from Sigma-Aldrich (St. Louis, Mo.).

ATBN refers to the amine terminated oligo (butadiene-acrylonitrile) that is commercially available under the trade designation HYCAR Reactive Liquid Polymer ATBN 1300X16 from Emerald Performance Materials (Akron, Ohio).

BA refers to benzoic acid, which is available from Sigma-Aldrich (St. Louis, Mo.).

BPN refers to benzopinacol, which is available from Sigma-Aldrich (St. Louis, Mo.).

BPO refers to benzoyl peroxide, which is available from Sigma-Aldrich (St. Louis, Mo.).

BZ-1 refers to bisphenol A-benzoxazine resin commercially available under the trade designation ARALDITE 35600 from Huntsman Advanced Materials America Inc. (Woodlands, Tex.).

DCP refers to di-cumyl peroxide, which is available from Sigma-Aldrich (St. Louis, Mo.).

DLP refers to di-lauroyl peroxide, which is available from Sigma-Aldrich (St. Louis, Mo.).

Fumed silica refers to the product that is commercially available under the trade designation CAB-O-SIL TS-720 from Cabot Corporation (Billerica, Mass.).

MXDA refers to the curative m-xylyl diamaine that is available from Mitsubishi Chemical (Japan).

P16 refers to di(2-tert-butylcyclohexyl)peroxydicarbonate that is commercially available under the trade designation PERKADOX 16 from Akzo Nobel Polymer Chemicals, LLC (Chicago, Ill.).

TBPTH refers to tert butyl-peroxy-3,5,5 trimethyl hexanoate, which is available from BOC Sciences (Shirley, N.Y.).

TMMP refers to the curative trimethylolpropane tris(3-mercaptoproprionate) that is available from Wako Chemical USA, Inc. (Richmond, Va.).

S refers to elemental sulfur that is commercially available under the trade designation ACRO CHEM (microtine wettable MC elemental sulfur), which is available from Acro Chem Corp. (Akron, Ohio).

Silicone-coated release liner refers to 1.5 mils (0.02 mm) polyethylene terephthalate (PET) film coated with silicone release coating sold that is commercially available under the trade designation PRIMELINER from Loparex LLC (Cary, N.C.).

$Cp_2FeSbF_6$ refers to a catalyst prepared as described in U.S. Pat. No. 5,089,536 (Palazzotto). The group Cp refers to cyclopentadienyl.

$XylCpFeSbF_6$ refers to a catalyst prepared as described in U.S. Pat. No. 5,089,536 (Palazzotto). The group Xyl refers to xylene and Cp refers to cyclopentadienyl.

$[(Me)_3Ph]_2[FeSbF_6]_2$ refers to a catalyst prepared as described in U.S. Pat. No. 5,089,536 (Palazzotto). The group Ph refers to phenyl.

$Cp_2FePF_6$ refers to a catalyst prepared as described in U.S. Pat. No. 5,089,536 (Palazzotto).

NACURE Super XC7231 refers to the catalyst ammonium antimony hexafluoride that is commercially available from King Industries (Norwalk, Conn.).

Iodonium CD1012 refers an iodonium salt that is available from Sartomer (Exton, Pa.).

Examples 1-8, Comparative Examples C1-C13

In Examples 1-4, finely ground powders of BZ-1 (23.1 grams; 0.1 mol) were thoroughly mixed with the peroxides (1.16 g; 5 wt %) shown in Table 1. A 3 mg to 10 mg sample of each mixture was heated in a differential scanning calorimeter according to the DSC Analysis described above to cure the mixtures. Results for onset temperature (Onset), peak temperature (Peak), and the energy (Energy) released in the peak exotherm are shown in Table 1.

Examples 5-8 were prepared and tested as in Examples 1-4 except that they also included a co-catalyst, sulfur (S), in amounts of 1.16 g; 5 wt % of BZ-1.

Examples C1 and C2 were prepared and tested as in Examples 1-4 except that they were mixed with benzoic acid instead of peroxide.

Example C3 contained only BZ-1 and was thermally cured with no initiator.

Examples C4-C13 were prepared and tested as in Examples 1-4 except as follows:

C4 and C5 used a catalyst was a non-acid forming peroxide, and C5 included sulfur.

C6 and C7 used an azo initiator (AIBN), and C7 included sulfur.

C8-C11 used thermal initiators as catalysts, and C9 and C11 included sulfur.

C12-C13 used benzopinacol as the catalyst and C13 included sulfur.

TABLE 1

DSC data for benzoxazine compositions with acid forming peroxides, co-catalysts.

| Example | Catalyst | Onset (° C.) | Shift in ° C. vs no cat. | Peak (° C.) | Shift in ° C. vs no cat. | Exotherm (J/g) |
|---|---|---|---|---|---|---|
| 1 | BPO | 188 | −41 | 210 | −30 | 345 |
| 2 | P16 | 226 | −3 | 239 | −1 | 242 |
| 3 | DLP | 225 | −4 | 237 | −3 | 325 |
| 4 | TBPTH | 215 | −14 | 231 | −9 | 244 |
| C1 | BA | 195 | −34 | 211 | −29 | 372 |
| 5 | BPO/S | 167 | −62 | 187 | −53 | 96 |
| 6 | P16/S | 176 | −53 | 225 | −15 | 297 |
| 7 | DLP/S | 176 | −53 | 220 | −20 | 229 |
| 8 | TBPTH/S | 214 | −15 | 230 | −10 | 298 |
| C2 | BA/S | 164 | −65 | 188 | −52 | 184 |
| C3 | None | 229 | 0 | 240 | 0 | 307 |
| C4 | DCP | 220 | — | 235 | — | 338 |
| C5 | DCP/S | 213 | — | 232 | — | 284 |
| C6 | AIBN | 227 | — | 239 | — | 257 |
| C7 | AIBN/S | 198 | — | 230 | — | 156 |
| C8 | VAZO 67 | 228 | — | 239 | — | 288 |
| C9 | VAZO 67/S | 202 | — | 231 | — | 209 |
| C10 | VAZO 52 | 228 | — | 239 | — | 307 |
| C11 | VAZO 52/S | 185 | — | 230 | — | 185 |

TABLE 1-continued

DSC data for benzoxazine compositions with acid forming peroxides, co-catalysts.

| Example | Catalyst | Onset (° C.) | Shift in ° C. vs no cat. | Peak (° C.) | Shift in ° C. vs no cat. | Exotherm (J/g) |
|---|---|---|---|---|---|---|
| C12 | BPN | 211 | — | 230 | — | 353 |
| C13 | BPN/S | 178 | — | 229 | — | 223 |

The data in the "shift in ° C. vs. no cat." column for Examples 1-9 show lower onset and peak temperatures during curing compared to a benzoxazine cured with no catalyst or curative (Example C3).

When the azo catalysts of Examples C6, C8, C10 and C12 were introduced to benzoxazine compositions containing 5% sulfur by weight (Examples C7, C9, C11, C13), the curing properties of the benzoxazine resin did not improve. In most instances, the exotherm energy released during benzoxazine polymerization was decreased, showing an undesirable trend during curing of the compositions of C4-C13.

Examples 9-14

In Examples 9-14, finely ground BZ-1 powder (23.1 grams; 0.1 mol) were thoroughly mixed with BPO (5 wt %/1.16 g) and with the co-catalyst shown in Table 2. Samples were heated and analyzed as described in the DSC Analysis and results are shown in Table 2.

Examples C14-C19 were prepared and tested as in Examples 9-14 except that no BPO was used. Test results are shown in Table 2. The Onset and Peak temperatures were compared with those of Comparative Example C3.

TABLE 2

DSC data for acid forming peroxides and super Lewis acid catalysts

| Example Number | Co-Catalyst/Catalyst | Onset (° C.) | Shift in ° C. vs no cat. | Peak (° C.) | Shift in ° C. vs no cat. | Exotherm (J/g) |
|---|---|---|---|---|---|---|
| 9 | $Cp_2FeSbF_6$/BPO | 175 | −54 | 195 | −45 | 280 |
| 10 | $XylCpFeSbF_6$/BPO | 185 | −44 | 223 | −17 | 302 |
| 11 | $[(Me)_3Ph]_2[FeSbF_6]_2$/BPO | 183 | −46 | 204 | −36 | 289 |
| 12 | $Cp_2FePF_6$/BPO | 165 | −64 | 189 | −51 | 190 |
| 13 | Nacure XC7231/BPO | 164 | −65 | 203 | −37 | 355 |
| 14 | Iodonium CD1012/BPO | 185 | −44 | 222 | −18 | 252 |
| C14 | $Cp_2FeSbF_6$/None | 190 | −39 | 218 | −22 | 335 |
| C15 | $XylCpFeSbF_6$/None | 208 | −21 | 233 | −7 | 284 |
| C16 | $[(Me)_3Ph]_2[FeSbF_6]_2$/None | 187 | −42 | 237 | −3 | 270 |
| C17 | $Cp_2FePF_6$/None | 181 | −48 | 206 | −34 | 202 |
| C18 | Nacure XC7231/None | 187 | −42 | 218 | −22 | 378 |
| C19 | Iodonium CD1012/None | 195 | −34 | 216 | −24 | 258 |

The data in Table 2 show lower onset and peak temperatures for compositions containing benzoyl peroxide.

Examples 15-23 and Comparative Examples C20-C24

Finely ground powders of BZ-1 (23.1 grams) were thoroughly mixed with the amounts of BPO and S shown in Table 3. In Example 16 the total amount of catalyst and co-catalyst used was 2%. The amounts of the catalyst and co-catalyst were varied as follows: $2^a$ was 1% S+3% BPO; $2^b$ was 2% S+2% BPO; and $2^c$ was 3% S+1% BPO. The amounts were each halved to provide 2% total catalyst. In Example 23, the total amount of catalyst was 2.5%.

Examples C20-C24 were prepared with only sulfur as the catalyst, in amounts of 1%-5%, respectively.

Samples of each mixture were heated and analyzed as described in the DSC Analysis and results are shown in Table 4. In Table 4, the mixtures containing 2% catalyst are superscripted to correspond with the relative amounts of S and BPO in each mixture as describe above.

TABLE 3

Compositions varying amounts of BPO and S

| Example | BZ-1 (g) | Sulfur (g) | Sulfur wt % | BPO (g) | BPO wt % |
|---|---|---|---|---|---|
| 15 | 23.1 | 0 | 0 | 0.23 | 1 |
| 16 | 23.1 | 0 | 0 | 0.46 | 2 |
| 17 | 23.1 | 0 | 0 | 0.69 | 3 |
| 18 | 23.1 | 0 | 0 | 0.92 | 4 |
| 19 | 46.2 | 0.23 | 0.5 | 0.23 | 0.5 |
| 20 | 46.2 | 0.23 | 0.5 | 0.69 | 1.5 |
| 21 | 46.2 | 0.46 | 1 | 0.46 | 1 |
| 22 | 46.2 | 0.69 | 1.5 | 0.23 | 0.5 |
| 23* | 46.2 | 1.16/2 | 2.5/2 | 1.16/2 | 2.5/2 |
| C20 | 23.1 | 0.23 | 1 | 0 | 0 |
| C21 | 23.1 | 0.46 | 2 | 0 | 0 |
| C22 | 23.1 | 0.69 | 3 | 0 | 0 |
| C23 | 23.1 | 0.92 | 4 | 0 | 0 |
| C24 | 23.1 | 1.16 | 5 | 0 | 0 |

*In Example 23, the total amount of BPO and sulfur was 2.5%. A mixture of 2.5% BPO and 2.5% sulfur was prepared and divided in two to provide a total amount of BPO and sulfur of 2.5%

TABLE 4

DSC data for compositions with varying amounts of BPO and S

| Total Wt % BPO & Sulfur | Onset (° C.) [Example Number] | | | Exotherm (J/g) [Example Number] | | | Peak (° C.) [Example Number] | | |
|---|---|---|---|---|---|---|---|---|---|
| | S | BPO | S + BPO | S | BPO | S + BPO | S | BPO | S + BPO |
| 1 | 220 [C20] | 216 [15] | 218 [19] | 290 [C20] | 272 [15] | 318 [19] | 235 [C20] | 232 [15] | 233 [19] |
| 2 | 216 [C21] | 207 [16] | 208 [20] | 299 [C21] | 302 [16] | 342 [20] | 233 [C21] | 230 [16] | 227 [20] |
| 2 | — | — | 216 [21] | — | — | 370 [21] | — | — | 231 [21] |

TABLE 4-continued

DSC data for compositions with varying amounts of BPO and S

| Total Wt % BPO & Sulfur | Onset (° C.) [Example Number] | | | Exotherm (J/g) [Example Number] | | | Peak (° C.) [Example Number] | | |
|---|---|---|---|---|---|---|---|---|---|
| | S | BPO | S + BPO | S | BPO | S + BPO | S | BPO | S + BPO |
| 2 | — | — | 210 [22] | — | — | 295 [22] | — | — | 228 [22] |
| 2.5 | — | — | 206 [23] | — | — | 336 [23] | — | — | 226 [23] | results are shown in Table 5. Test samples were also prepared and tested for floating roller peel (FRP) as described above. Test results are shown in Table 6.

TABLE 5

Adhesive compositions

| Example | BZ-1 (g) | Sulfur (g) | BPO (g) | ATBN (g) | ATBN (wt %) |
|---|---|---|---|---|---|
| 24 | 23.1 | 0.2 | 0.5 | 5 | 18 |
| 25 | 23.1 | 0.2 | 0.5 | 7 | 23 |
| C25 | 23.1 | 0.2 | 0 | 5 | 18 |
| C26 | 23.1 | 0.2 | 0 | 7 | 23 |

TABLE 6

Overlap shear strength of adhesive compositions

| Ex | ATBN (Wt %) | Overlap Shear @ 24° C. | | | Overlap Shear @ 135° C. | | | Overlap Shear @ 177° C. | | |
|---|---|---|---|---|---|---|---|---|---|---|
| | | $OLS_{avg}$ | $OLS_{max}$ | $OLS_{sd}$ | $OLS_{avg}$ | $OLS_{max}$ | $OLS_s$ | $OLS_{avg}$ | $OLS_{max}$ | $OLS_s$ |
| 24 | 18 | 3239 | 3619 | 214 | 1407 | 1642 | 148 | 738 | 842 | 74 |
| 25 | 23 | 3179 | 3230 | 32 | 1385 | 1480 | 85 | 574 | 615 | 30 |
| C25 | 18 | 1538 | 1624 | 131 | Fail | Fail | Fail | 299 | 359 | 60 |
| C26 | 23 | 2472 | 2608 | 96 | 591 | 702 | 61 | 360 | 390 | 25 |

TABLE 4-continued

DSC data for compositions with varying amounts of BPO and S

| Total Wt % BPO & Sulfur | Onset (° C.) [Example Number] | | | Exotherm (J/g) [Example Number] | | | Peak (° C.) [Example Number] | | |
|---|---|---|---|---|---|---|---|---|---|
| | S | BPO | S + BPO | S | BPO | S + BPO | S | BPO | S + BPO |
| 3 | 210 [C22] | 203 [17] | — | 220 [C22] | 291 [17] | — | 232 [C22] | 230 [17] | — |
| 4 | 208 [C23] | 196 [18] | — | 276 [23] | 315 [18] | — | 231 [23] | 218 [18] | — |
| 5 | 202 [C24] | 188 [1] | — | 252 [C24] | 345 [1] | — | 229 [C24] | 210 [1] | — |

The data in Table 4 show that the combination of sulfur and benzoyl peroxide can lower the onset and peak polymerization temperatures than either the sulfur or the peroxide by itself. Additionally, but the energy released during polymerization was not lowered because the amount of sulfur was kept low enough by substitution with peroxide.

Examples 24-25 and Comparative Examples C25-C26

A stock composition was prepared by heating 231 grams of ground BZ-1, 3 grams of fumed silica and 2 grams of S at 130° C. to form a molten mixture. Four portions, each having 23.1 grams were weighed out, and 5 or 7 grams of ATBN, preheated to 100° C., were added to Ex 24 and 25, respectively, and mixed vigorously while cooling. Then, 0.5 grams of BPO were added to each example and mixed vigorously.

Examples C25 and C26 were prepared as in Examples 24-25, except without BPO.

Each mixture was coated while still hot between two silicone release liners to a 250 micrometer-thick film using a knife coater set at 80° C. to form an adhesive film. The adhesive films were prepared into an Overlap Shear test sample, cured at 350° F. (177° C.) tested for the overlap shear (OLS) at 24° C., 135° C., and 177° C. as described above. Test

TABLE 7

Floating roller peel strength of adhesive compositions

| Example | Wt % ATBN | $Peel_{avg}$ | $Peel_{max}$ | $Peel_{dev}$ |
|---|---|---|---|---|
| 24 | 18 | 22.6 | 23.1 | 0.62 |
| 25 | 23 | 23.4 | 23.9 | 0.59 |
| C25 | 18 | Fail | Fail | Fail |
| C26 | 23 | 7.6 | 9.7 | 2.0 |

The data in Tables 6 and 7 show that the addition of an acid forming peroxide lowered the cure temperatures of the film adhesives. The peroxide also showed improved overlap shear strength, and peel adhesive strength, exhibiting superior performance at elevated test temperatures.

Examples 26-27 and Comparative Examples C27-C28

Finely ground powders of BZ-1 (2.31 grams; 0.01 mol) were thoroughly mixed with the types and amounts of curative and the amounts of catalyst (BPO) shown in Table 7. The total amount of curative and BZ-1 added up to 5 wt % of the total composition. A 3 mg to 10 mg sample of each mixture was heated in a DSC according to the DSC Analysis described above to cure the mixtures. Results for onset temperature (Onset), peak temperature (Peak), and the energy (Energy) released in the peak exotherm are shown in Table 8.

TABLE 8

Compositions with BPO and curatives, and corresponding DSC data

| Ex | BZ-1 (g) | Curative (0.01 mol) | Curative (g) | BPO (g) | Onset (° C.) | Peak (° C.) | Exotherm (J/g) |
|---|---|---|---|---|---|---|---|
| 26 | 2.31 | TMMP | 1.33 | 0.182 | 135 | 163 | 174 |
| C27 | 2.31 | TMMP | 1.33 | 0 | 149 | 224 | 211 |

TABLE 8-continued

Compositions with BPO and curatives, and corresponding DSC data

| Ex | BZ-1 (g) | Curative (0.01 mol) | Curative (g) | BPO (g) | Onset (° C.) | Peak (° C.) | Exotherm (J/g) |
|---|---|---|---|---|---|---|---|
| 27 | 2.31 | MXDA | 0.34 | 0.133 | 60; 113 | 86; 138 | 86; 200 |
| C28 | 2.31 | MXDA | 0.34 | 0 | 92 | 104 | 199 |

Comparative Example C29

A composition was prepared as described in Example 1 with 23.1 grams of BZ-1 and 0.16 g of sulfur, and without peroxide. Approximately 3 grams of the composition was cured in a DSC and the DSC data are shown in Table 9.

TABLE 9

DSC data for sulfur as catalyst

| Example | Catalyst | Onset (° C.) | Shift in ° C. vs no cat. | Peak (° C.) | Shift in ° C. vs no cat. | Exotherm (J/g) |
|---|---|---|---|---|---|---|
| C29 | Sulfur | 180 | −49 | 227 | −13 | 292 |

The DSC traces of FIG. 1 show the effect benozoyl peroxide addition of the present invention (Example 27) to the MXDA cure benzoxazine without peroxide (Example C28). The primary amine cure of benzoxazine which shows an onset at 92° C. with a peak at 104° C. shifts significantly lower with BPO added (onset at 60° C. with a peak at 86° C.). The advent of the secondary amine reaction to which the broader high temperature exotherm is attributed, similarly shows a profound shift to lower temperatures while the overall energy released during the benzoxazine cure (199 J/g) is preserved with the addition of peroxide (286 J/g). Thus, addition of peroxide to the amine-cured benzoxazine composition provides for a more complete cure at lower temperatures. Data from Example 26 and C27 suggest a similar effect was observed upon the introduction of acid forming peroxide (BPO) to a thiol cured benzoxazine system. The data in Table 8 show lower onset temperatures with the addition of BPO.

The DSC traces of FIG. 2 show the effect benozoyl peroxide addition of the present invention (Examples 1 and 5) to the benzoxazine cured without peroxide (Example C3) and to the benzoxazine/sulfur cured without peroxide (Example C29). The FIG. 2 shows a profound shift to lower temperatures while the overall energy released during the benzoxazine cure (307 J/g) or Bz/S cure (292 J/g) is largely preserved with the addition of peroxide (345 J/g) and (229 J/g) respectively. Thus, addition of acid forming peroxide to the benzoxazine cured or Bz/S cured composition provides for a more complete cure at lower temperatures.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A polymerizable composition comprising:
    a 3,4-dihydro-1,3-benzoxazine;
    an acid-forming peroxide catalyst;
    a non-reactive film-forming material,
    wherein the composition is polymerizable by ionic ring opening of the benzoxazine;
    and optionally a co-catalyst, a curative, or a combination thereof.

2. The polymerizable composition of claim 1 wherein the acid-forming peroxide catalyst is present in an amount of 0.1 wt-% to 10 wt-%, based on the total weight of the benzoxazine.

3. The polymerizable composition of claim 1 wherein the film-forming material is present in an amount of 10 wt-% to 75 wt-%, based on the total weight of the polymerizable composition.

4. The polymerizable composition of claim 1 wherein the acid-forming peroxide catalyst comprises a carboxyl group, acetyl group, phthalyl group, sulfonyl group, or a combination thereof.

5. The polymerizable composition of claim 4 wherein the acid-forming peroxide catalyst is selected from the group of a diacyl peroxide, a peroxydicarbonate, a peroxy ester, and a combination thereof.

6. The polymerizable composition of claim 1 free of a chlorinated organic solvent.

7. The polymerizable composition of claim 1 wherein the composition comprises a co-catalyst, wherein the co-catalyst is selected from the group of elemental sulfur, elemental selenium, a sulfide of a Group VA element, a sulfide of a Group VIA element, a selenide of a Group VA element, a selenide of a Group VIA element, and a combination thereof.

8. The polymerizable composition of claim 1 wherein the composition comprises a co-catalyst, wherein the co-catalyst is a salt of an organometallic complex cation.

9. The polymerizable composition of claim 1 wherein the composition comprises a curative, wherein the curative is selected from the group of a thiol compound, an amine compound, and a combination thereof.

10. The polymerizable composition of claim 1 comprising:
    a 3,4-dihydro-1,3-benzoxazine; and
    an acid-forming peroxide catalyst;
    wherein the polymerizable composition is free of a chlorinated organic solvent.

11. An article comprising a substrate and an adhesive film disposed thereon comprising a polymerizable composition of claim 1.

12. A method of forming an adhesive, the method comprising:
    providing a polymerizable composition of claim 1; and
    heating the polymerizable composition at a temperature and for a time effective to at least partially polymerize the benzoxazine.

13. A method of forming an adhesive, the method comprising:
    providing the polymerizable composition of claim 1; and
    heating the polymerizable composition at a temperature of at least 150° C. for a time effective to at least partially polymerize the benzoxazine by ionic ring opening of the benzoxazine.

* * * * *